US008495215B2

(12) United States Patent
Okazaki

(10) Patent No.: US 8,495,215 B2
(45) Date of Patent: Jul. 23, 2013

(54) SERVICE URL MANAGEMENT DEVICE AND SERVICE URL MANAGEMENT METHOD

(75) Inventor: Masaki Okazaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 413 days.

(21) Appl. No.: 12/423,064

(22) Filed: Apr. 14, 2009

(65) Prior Publication Data

US 2009/0287820 A1 Nov. 19, 2009

(30) Foreign Application Priority Data

May 16, 2008 (JP) ................................ 2008-129054

(51) Int. Cl.
*G06F 15/173* (2006.01)

(52) U.S. Cl.
USPC ......................................................... 709/226

(58) Field of Classification Search
USPC .................................. 709/223–226; 370/255
See application file for complete search history.

(56) References Cited

U.S. PATENT DOCUMENTS

| 7,779,097 | B2 * | 8/2010 | Lamkin et al. ................. 709/223 |
| 2005/0021786 | A1 * | 1/2005 | Kikkawa et al. ............... 709/229 |
| 2005/0050181 | A1 * | 3/2005 | Morioka ........................ 709/221 |
| 2005/0138137 | A1 * | 6/2005 | Encarnacion et al. ........ 709/217 |
| 2005/0152287 | A1 * | 7/2005 | Yokomitsu et al. ............ 370/255 |
| 2005/0185658 | A1 * | 8/2005 | Kamiwada et al. ........... 370/401 |
| 2006/0184661 | A1 * | 8/2006 | Weisman et al. .............. 709/224 |
| 2006/0187858 | A1 | 8/2006 | Kenichi et al. |
| 2007/0237159 | A1 * | 10/2007 | Yamada et al. ........... 370/395.53 |
| 2008/0304408 | A1 * | 12/2008 | Kraemer et al. ............... 370/230 |
| 2009/0292830 | A1 * | 11/2009 | Nagashima et al. ............. 710/13 |

FOREIGN PATENT DOCUMENTS

| JP | 2006-260425 A | 9/2006 |
| WO | WO-2005/104493 A1 | 11/2005 |
| WO | WO-2008/040617 A1 | 4/2008 |

OTHER PUBLICATIONS

Ditze et al.; "Resource Adaptation for Audio-Visual Devices in the UPnP QoS Architecture"; Advanced Information Networking and Applications, 2006; NJ, USA; vol. 2; Apr. 2006.

* cited by examiner

*Primary Examiner* — Shirley Zhang
(74) *Attorney, Agent, or Firm* — Global IP Counselors

(57) ABSTRACT

An information processing device is configured to communicate with a network device via a network using UPnP (Universal Plug and Play). The information processing device includes a management component and a memory component. The management component is configured to manage a plurality of service URLs (Uniform Resource Locator) of the network device with the service URLs specifying locations of XML (Extensive Markup Language) files that indicate different services provided by the network device. The memory component is configured to store a management record of the service URLs of the network device with the management record having a common record that includes a MAC (Media Access Control) address, an IP (Internet Protocol) address and a port number of the network device, and a plurality of service records that includes a plurality of directory file paths to the XML files.

9 Claims, 5 Drawing Sheets

SERVICE URL MANAGEMENT DEVICE AND SERVICE URL MANAGEMENT METHOD

CROSS-REFERENCE TO RELATED APPLICATIONS

This application claims priority to Japanese Patent Application No. 2008-129054 filed on May 16, 2008. The entire disclosure of Japanese Patent Application No. 2008-129054 is hereby incorporated herein by reference.

BACKGROUND OF THE INVENTION

1. Field of the Invention

The present invention generally relates to an information processing device. More specifically, the present invention relates to an information processing device communicating with a network device via a network.

2. Background Information

A conventional content distribution system includes a network player and a network server. The network player reproduces video, audio, and other such content data (hereinafter referred to as content). The network server is connected to the network player via a network. The network player and the network server correspond to a DLNA (Digital Living Network Alliance). The network server has a hard disk and a control-use microprocessor. The content is recorded to the hard disk. The control-use microprocessor includes a CPU that performs control processing for controlling the various components of the network server. When a content acquisition request (e.g., an HTTP (HyperText Transfer Protocol) request message such as an HTTP GET) is sent from the network player, the content corresponding to the content acquisition request is sent from the network server to the network player. Then, the network player receives and reproduces the content.

The network player serves as a control point specified by UPnP (Universal Plug and Play) and executes a search action. The common language of the UPnP is HTTP, and information that is exchanged is expressed in XML (Extensible Markup Language). With the UPnP, the control point indicates a device that controls the network server. The search action is used to acquire content information from the network server. When the control point sends a content number or the like to the network server, information related to the content number and the individual pieces of content returns from the network server.

The network player is an information processing device that communicates with the network server via the network using UPnP. The network player on the network manages a plurality of service URLs (Uniform Resource Locator) indicating XML files in which are recorded contents of services that are provided and disclosed by the network server.

The service URL is managed such that a MAC (Media Access Control) address, an IP (Internet Protocol) address, a port number, a directory file path and a service identifier are stored as one record in a memory of the network player. In the memory, the service URLs are registered in a number corresponding to the number of services provided by the network server.

With another conventional content distribution system, a device management table contains device description information, service description information, an Ethernet MAC address, and operating/standby state information for each individual UPnP device (see Japanese Laid-Open Patent Application Publication No. 2006-260425, for example).

When a single network server provides a plurality of services, the service URLs provided by the single network server include the same MAC address, the same IP address and the same port number, respectively.

With the conventional content distribution system, the service URL is managed such that the MAC address, the IP address, the port number and the directory file path are stored as one record, and are registered directly to the memory in a number corresponding to the number of services provided (that is, the number of service LRLs corresponding to the number of services). Thus, adequate memory capacity has to be ensured beforehand to store the service URLs. Also, adequate memory capacity has to be ensured beforehand to store the device management table for each individual UPnP device.

Furthermore, with the conventional content distribution system, the MAC address, the IP address and the port number are redundantly registered in a number corresponding to the number of the services provided. Thus, memory capacity has to be increased.

In view of the above, it will be apparent to those skilled in the art from this disclosure that there exists a need for an information processing device. This invention addresses this need in the art as well as other needs, which will become apparent to those skilled in the art from this disclosure.

SUMMARY OF THE INVENTION

The present invention was conceived in light of the above mentioned problems.

One object of the present invention is to provide an information processing device with which a plurality of service URLs are adequately managed.

In accordance with one aspect of the present invention, an information processing device is configured to communicate with a network device via a network using UPnP (Universal Plug and Play). The information processing device includes a management component and a memory component. The management component is configured to manage a plurality of service URLs (Uniform Resource Locator) of the network device with the service URLs specifying locations of XML (Extensive Markup Language) files that indicate different services provided by the network device. The memory component is configured to store a management record of the service URLs of the network device with the management record having a common record that includes a MAC (Media Access Control) address, an IP (Internet Protocol) address and a port number of the network device, and a plurality of service records that includes a plurality of directory file paths to the XML files.

With the information processing device, it is possible to provide an information processing device with which a plurality of service URLs are adequately managed.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 1:
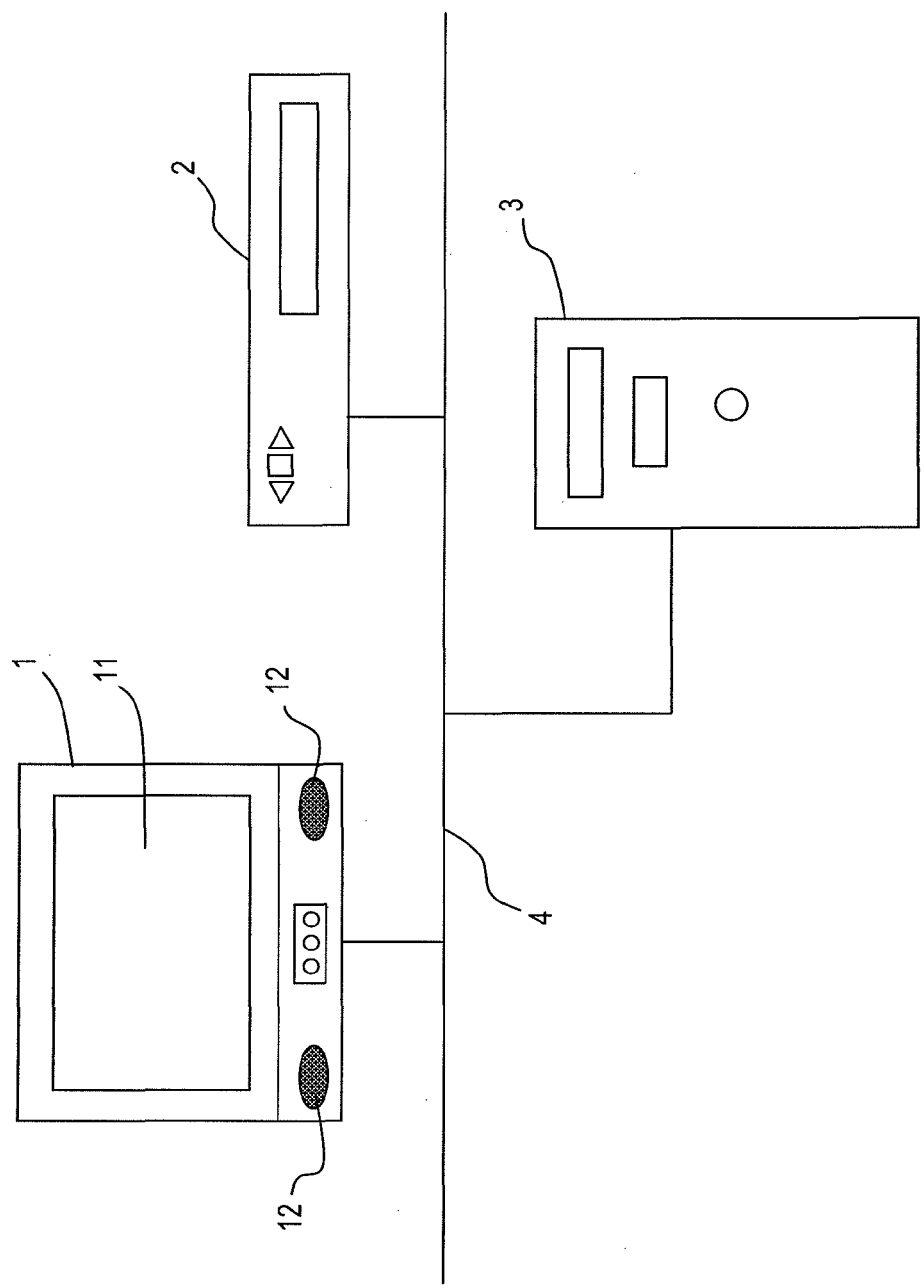
FIG. 1 is a block diagram of a content distribution system including a network player and a network server.

As shown in FIG. 1, a content distribution system includes a network player (e.g., information processing device) 1, and a plurality of network servers (e.g., network device) 2 and 3 (two in FIG. 1). The network player 1 reproduces video, audio, or other such content data (hereinafter referred to as content). The network servers 2 and 3 are connected to the network player 1 via a network 4, such as LAN (Local Area Network), WAN (Wide Area Network), the Internet and the like. The network player 1 and the network servers 2 and 3 are DLNA (Digital Living Network Alliance) compliant devices, and are easily added to or removed from the network 4. Also, the network player 1 and the network servers 2 and 3 are compliant with UPnP (Universal Plug and Play). The network player 1 serves as a control point, and executes a search action. The network servers 2 and 3 execute a content search function.

Figure 2:
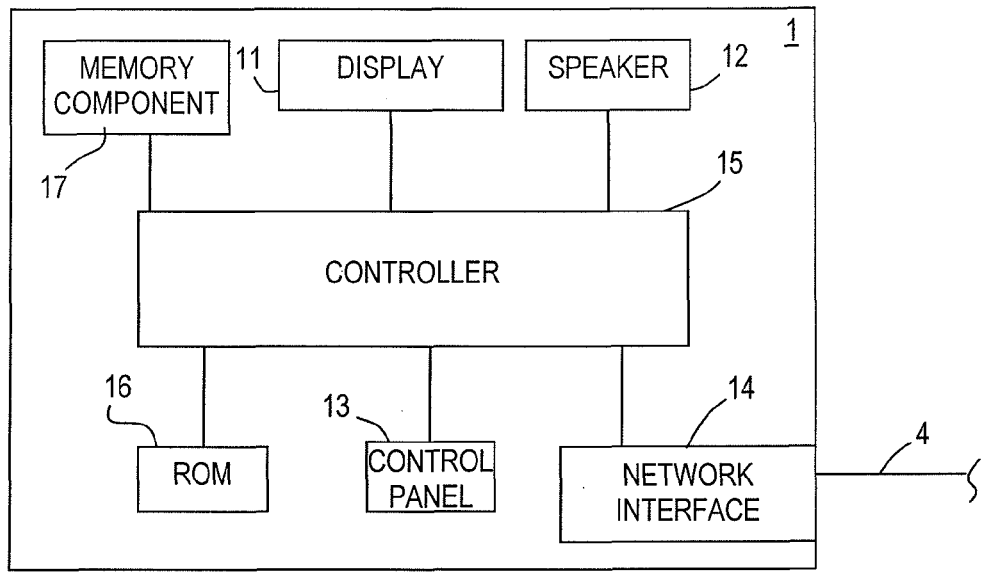
FIG. 2 is a block diagram of the network player illustrated in FIG. 1.

FIG. 2 is a block diagram of the network player 1. The network player 1 includes a display 11, a speaker 12, a control panel 13, a network interface (e.g., communication means) 14, a controller (e.g., management component) 15, a ROM (Read Only Memory) 16 and a memory component 17. The network interface 14 sends a content acquisition request (e.g., an HTTP (HyperText Transfer Protocol) request message such as an HTTP GET) to the network servers 2 and 3 and receive the content corresponding to the content acquisition request from the network servers 2 and 3. The control panel 13 includes a remote control or the like with buttons for the user to operate. The controller 15 controls reproduction of the received content and various components of the network player 1. The ROM 16 stores operating programs of the controller 15. The memory component 17 stores a management database for managing contents of services provided by the network servers 2 and 3. The display 11 outputs the contents such as the videos or images received through the network interface 14. The speaker 12 outputs audio based on an audio signal outputted from the controller 15. The memory component 17 includes a rewritable nonvolatile memory, such as a flash memory or an EEPROM (Electrically Erasable Programmable Read Only Memory). Furthermore, the memory component 17 can include other types of storage device, such as a semiconductor memory and a hard disk drive.

Figure 3:
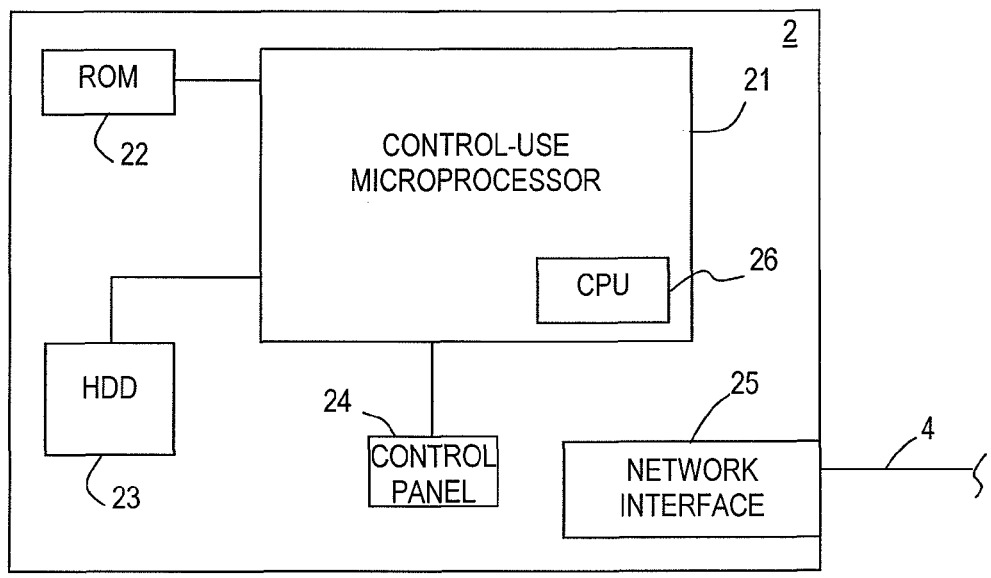
FIG. 3 is a block diagram of the network server illustrated in FIG. 1.

FIG. 3 is a block diagram of the network server 2. The network server 3 has the same configuration as the network server 2, and the processing performed by the network server 2 can also be performed by the network server 3.

The network server 2 includes a control-use microprocessor 21, a ROM 22, a hard disk drive (HDD) 23, a control panel 24 and a network interface 25. The hard disk drive 23 stores the contents. The control panel 24 includes a remote control or the like that is operated by the user. The network interface 25 receives the content acquisition request sent from the network player 1 and sends the content corresponding to the content acquisition request. The control-use microprocessor 21 has a CPU (Central Processing Unit) 26. The CPU 26 performs control processing for controlling the various components of the network server 2. The ROM 22 stores the operating programs of the control-use microprocessor 21.

Figure 4:
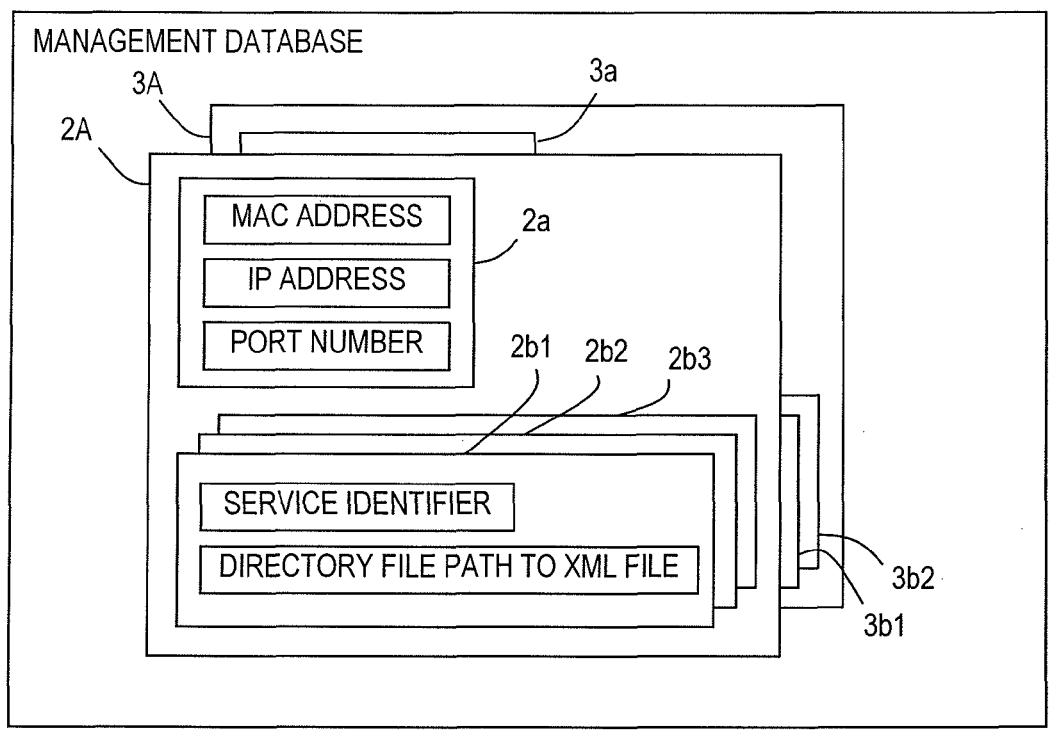
FIG. 4 is a schematic diagram illustrating a management database stored in a memory of the network player illustrated in FIG. 1.

FIG. 4 is a schematic diagram illustrating the management database stored in the memory component 17 of the network player 1.

The management database is a database that manages a plurality of service URLs (Uniform Resource Locator) provided by the network servers 2 and 3. The management database is managed by the controller 15 of the network player 1. The service URLs specify locations of XML (Extensive Markup Language) files that indicate a plurality of different services provided by the network servers 2 and 3. Specifically, each of the service URLs provided by the network server 2 includes an IP (Internet Protocol) address of the network server 2, a port number of the network server 2, a service identifier and a directory file path to the XML file. The service URLs provided by the network server 2 include the same IP address and the same port number, respectively. The service identifier identifies the service provided by the network server 2.

The management database has a plurality of (two in FIG. 4) management records 2A and 3A for the network servers 2 and 3, respectively. The management records 2A and 3A manage the service URLs provided by the network servers 2 and 3, respectively. Specifically, when the network server 2 provides a plurality of services, then the network server 2 provides a plurality of service URLs corresponding to the services. The management record 2A for the network server 2 includes only one shared record (e.g., common record) 2*a* and a plurality of (three in FIG. 4) service records (e.g., service record) 2*b*1, 2*b*2 and 2*b*3. The shared record 2*a* of the management record 2A has only one set of a MAC (Media Access Control) address of the network server 2, the IP address of the network server 2 and the port number of the network server 2. The IP address and the port number is obtained from the service URL provided by the network server 2. The MAC address of the network server 2 is obtained based on the IP address of the network server 2 using ARP (Address Resolution Protocol), for example. The MAC address can be obtained from the service URL provided by the network server 2 when the service URL provided by the network server 2 includes the MAC address of the network server 2. Since the MAC address, the IP address and the port number are the common record to the network server 2, the shared record 2*a* of the management record 2A is shared by the service records 2*b*1, 2*b*2 and 2*b*3. Each of the service records 2*b*1, 2*b*2 and 2*b*3 includes the service identifier and the directory file path to the XML file. Since the service identifiers and the directory file paths vary according to the services provided by the network server 2, the service records 2*b*1, 2*b*2 and 2*b*3 are associated with the shared record 2*a* and registered in the management record 2A.

As shown in FIG. 4, the network server 2 provides three different services. Therefore, one piece of the shared record 2*a* is registered in the management record 2A corresponding to the network server 2 in the management database, and three individual pieces of the service records 2*b*1, 2*b*2 and 2*b*3 corresponding to the contents of the three services are registered in a form corresponding to the shared record 2*a*. Furthermore, one group of shared record 3*a* and individual service records 3*b*1, 3*b*2, . . . corresponding to the number of the services provided by the network server 3 are registered in the management record 3A corresponding to the network server 3. In the management database, the shared records 2*a* and 3*a* are shared with the service records 2*b*1, 2*b*2 and 2*b*3 and the service records 3*b*1 and 3*b*2, respectively. Thus, the MAC address, the IP address and the port number are prevented from being redundantly registered according to the number of the services provided by the network servers 2 and 3. This affords a corresponding reduction in a storage region of the memory component 17 used for the management database.

With the management database, the directory file paths of the service URLs provided by the network servers 2 and 3 are managed based on the MAC addresses of the network servers 2 and 3, respectively. Specifically, the MAC address, the IP address and the port number, which are shared by the service URLs provided by the network server 2, respectively, are registered as a single group of the shared record 2*a*. Furthermore, the service identifiers and the directory file paths that vary with the services provided by the network server 2 are registered corresponding to the shared record 2*a*. In other words, for each of the network servers 2 and 3, just one group of the MAC address, the IP address and the port number is registered and shared for managing the service URLs. Thus, the storage region of the memory component 17 can be reduced. Therefore, the service URLs can be managed more effectively.

Figure 5:
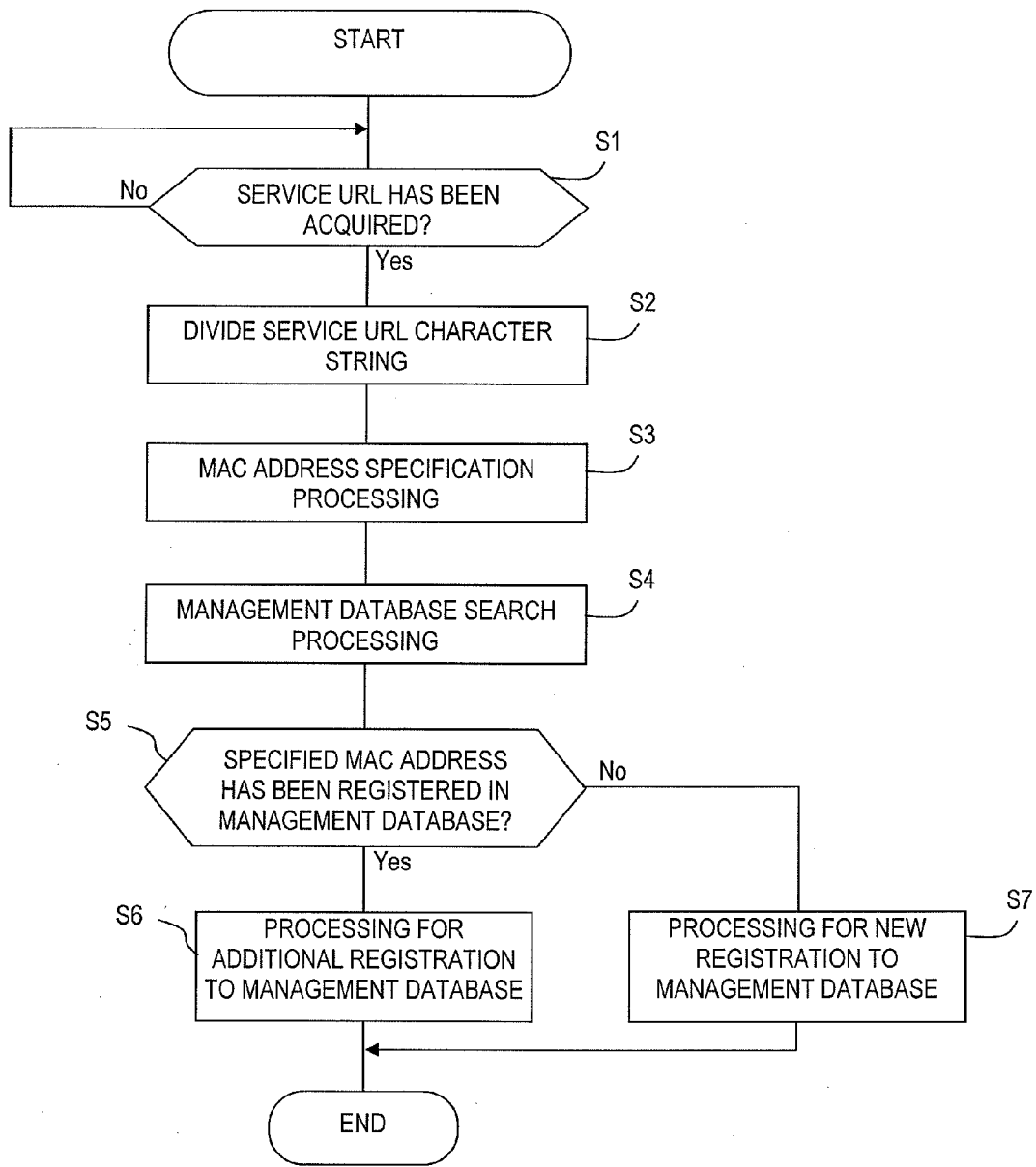
FIG. 5 is a flowchart illustrating a processing for additional registration to the management database.

FIG. 5 is a flowchart illustrating a processing for additional registration to the management database. The registration processing is executed by the controller 15 of the network player 1.

The controller 15 acquires the service URL from the network server 2 (step S1). The controller 15 divides character string of the service URL into constituent elements (step S2). Specifically, the controller 15 obtains the IP address, the port number, the service identifier and the directory file path to the XML file from the service URL. Then, the controller 15 specifies the MAC address of the network server 2 based on the IP address that is obtained from the service URL as one of the divided constituent elements (step S3). Specifically, the MAC address is found based on the IP address using the ARP. The controller 15 searches the specified MAC address in the management database of the memory component 17 (step S4), and determines whether or not the specified MAC address has been registered to the management database (step S5).

If the specified MAC address has been registered ("Yes" in step S5), then it is determined that a new service has been added to the network server 2, and processing for additional registration of the new service is performed (step S6). Specifically, the service identifier and the directory file path acquired this time are additionally registered in the management record 2A of the management database. In particular, in the management record 2A, the service identifier and the directory file path acquired this time correspond to the shared record 2*a*. Consequently, when the new service has been added to the network server 2 that is connected to the network 4, a management record of the service URL for the new service can be additionally registered in the management database.

On the other hand, if the specified MAC address has not been registered ("No" in step S5), then it is determined that the network server 2 is a new network server newly connected to the network 4, and processing for new registration of the management record 2A is performed (step S7). Specifically, the service URL acquired this time is newly registered in the management database as the service URL for the new network server, and the management database is updated. Specifically, the IP address and the port number that are obtained in step S2 and the specified MAC address are registered as the shared record 2*a* in the management record 2A. Furthermore, the service identifier and the directory file path that are obtained in step S2 are registered as the service record 2*b*1, for example, in the record 2A in association with the shared record 2*a*.

The IP address of the network server 2 is sometimes changed. When this happens, the IP address of the shared record 2*a* in the management database need to be updated correspondingly.

Figure 6:
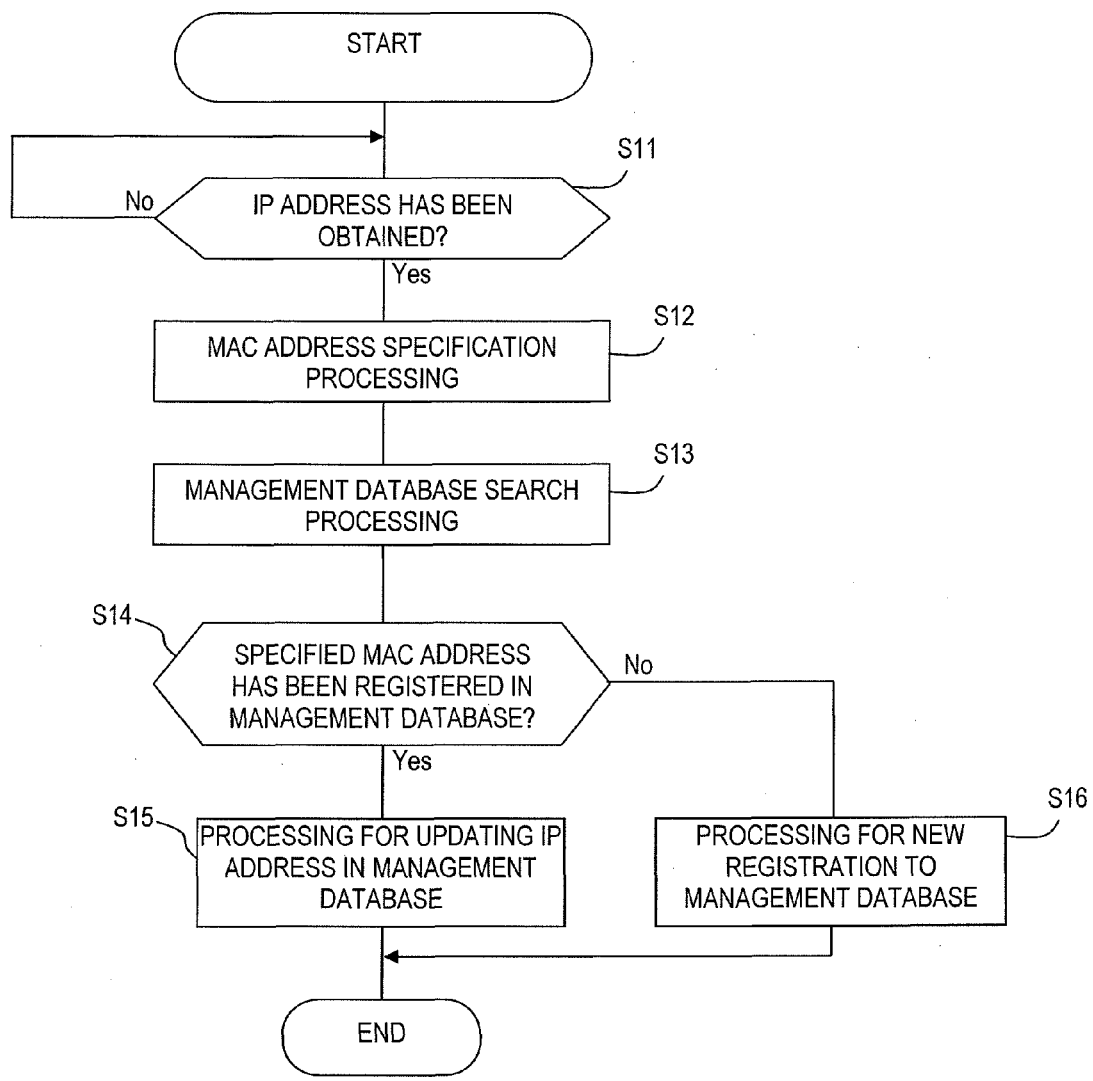
FIG. 6 is a flowchart illustrating a processing for updating an IP address in the management database.

FIG. 6 is a flowchart illustrating a processing for updating the IP address in the management database. The update processing of the IP address is executed by the controller 15 of the network player 1.

When a new network server 2 is newly connected to the network 4, the controller 15 obtains a new IP address from the network server 2 (step S11). For example, the network server 2 is newly connected to the network 4 when the network server 2 is reconnected to the network 4 after being removed from the network 4 or when the network server 2 is connected to the network 4 for the first time. The controller 15 specifies the MAC address of the network server 2 based on the obtained IP address (step S12). Specifically, the MAC address is found based on the IP address using the ARP. The controller 15 searches the specified MAC address in the management database of the memory component 17 (step S13), and determines whether or not the specified MAC address has been registered in the management database (step S14).

If the specified MAC address has been registered ("Yes" in step S14), then it is determined that the network server 2 is reconnect to the network 4 this time after being removed from the network 4, and that the IP address of the network server 2 has been changed. Then, processing for updating the IP address in the management database is performed (step S15). Specifically, the IP address of the network server 2 stored in the shared record 2*a* is updated to the obtained IP address that is obtained this time in step S11.

If the specified MAC address has not been registered ("No" in step S14), then it is determined that the network server 2 is a new network server that is connected to the network 4 for the first time. Then, processing for new registration of the management record 2A is performed (step S16). Specifically, the controller 15 acquires the service URL from the network server 2, and obtains the port number, the service identifier and the directory file path from the service URL. Then, the specified MAC address, the obtained IP address that is obtained in step S11 and the obtained port number that is obtained from the service URL are registered as the shared record 2*a* in the management record 2A. Furthermore, the service identifier and the directory file path that are obtained from the service URL are registered as the service record 2*b*1, for example, in the management record 2A in association with the shared record 2*a*. The controller 15 can register the IP address obtained from the service URL in the shared record 2*a* instead of the obtained IP address that is obtained in step S11.

In the network 4, not only the network player 1 but also the network servers 2 and 3 can serve as the control point. In other words, the network servers 2 and 3 can store the management database and manage the service URLs using the management database.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. An information processing device configured to communicate with a network device via a network using UPnP (Universal Plug and Play), comprising:
    a management component configured to manage a plurality of service URLs (Uniform Resource Locator) of the network device with the service URLs specifying locations of XML (Extensive Markup Language) files that indicate different services provided by the network device, respectively, the management component being configured to divide each of the service URLs into a common record that includes a MAC (Media Access Control) address, an IP (Internet Protocol) address and a port number of the network device, and a service record that includes a directory file path to respective one of the XML files; and
    a memory component configured to store a management record of the service URLs of the network device by sharing one of the common records of the service URLs between the service records of the service URLs such that the management record of the service URLs has the one of the common records and the service records in one-to-many correspondence to prevent the common records of the service URLs from being redundantly registered in the management record of the service URLs.

2. The information processing device according to claim 1, wherein
    each of the service records further includes a service identifier identifying respective one of the different services provided by the network device.

3. The information processing device according to claim 2, wherein
    the management component acquires a service URL of a new network device from the new network device, obtains an IP address of the new network device from the acquired service URL, specifies a MAC address of the new network device based on the obtained IP address of the new network device, determines whether or not the management record stored in the memory component includes the specified MAC address of the new network device, and creates a new management record of the acquired service URL of the new network device based on the acquired service URL acquired from the new network device when the management record stored in the memory component does not include the specified MAC address of the new network device.

4. The information processing device according to claim 3, wherein
    the management component further obtains a port number of the new network device, a directory file path to a XML file indicating a service provided by the new network device and a service identifier identifying the service provided by the new network device, and creates the new management record having a common record that includes the specified MAC address, the obtained IP address and the obtained port number of the new network device, and a service record that includes the obtained directory file path to the XML file and the obtained service identifier when the management record stored in the memory component does not include the specified MAC address of the new network device.

5. The information processing device according to claim 1, wherein
    the management component obtains an IP address of a new network device when the new network device is newly connected to the network, specifies a MAC address of the new network device based on the obtained IP address of the new network device, determines whether or not the management record stored in the memory component includes the specified MAC address of the new network device, and updates the IP address of the common record in the management record stored in the memory component with the obtained IP address of the new network device when the management record stored in the memory component includes the specified MAC address of the new network device.

6. The information processing device according to claim 2, wherein
    the management component obtains an IP address of a new network device when the new network device is newly connected to the network, specifies a MAC address of the new network device based on the obtained IP address of the new network device, determines whether or not the management record stored in the memory component includes the specified MAC address of the new network device, and updates the IP address of the common record in the management record stored in the memory component with the obtained IP address of the new network device when the management record stored in the memory component includes the specified MAC address of the new network device.

7. An information processing method of an information processing device configured to communicate with a network device via a network using UPnP (Universal Plug and Play), comprising:
    dividing each of a plurality of service URLs (Uniform Resource Locator) of the network device into a common record and a service record, the service URLs specifying locations of XML (Extensive Markup Language) files that indicate different services provided by the network device, respectively, each of the common records including a MAC (Media Access Control) address, an IP (Internet Protocol) address and a port number of the network device, each of the service records including a directory file path to respective one of the XML files and a service identifier identifying respective one of the different services provided by the network device;

providing a management record of the service URLs of the network device in a memory component of the information processing device by sharing one of the common records of the service URLs between the service records of the service URLs such that the management record of the service URLs has the one of the common records and the service records in one-to-many correspondence to prevent the common records of the service URLs from being redundantly registered in the management record of the service URLs;

acquiring a service URL of a new network device from the new network device;

obtaining an IP address of the new network device from the acquired service URL;

specifying a MAC address of the new network device based on the obtained IP address of the new network device;

determining whether or not the management record provided in the memory component includes the specified MAC address of the new network device; and creating a new management record of the acquired service URL of the new network device based on the acquired service URL acquired from the new network device when the management record provided in the memory component does not include the specified MAC address of the new network device.

8. The information processing method according to claim 7, further comprising obtaining a port number of the new network device, a directory file path to a XML file indicating a service provided by the new network device and a service identifier identifying the service provided by the new network device from the acquired service URL, the creating of the new management record further includes creating the new management record having a common record that includes the specified MAC address, the obtained IP address and the obtained port number of the new network device, and a service record that includes the obtained directory file path to the XML file and the obtained service identifier when the management record provided in the memory component does not include the specified MAC address of the new network device.

9. An information processing method of an information processing device configured to communicate with a network device via a network using UPnP (Universal Plug and Play), comprising:

dividing each of a plurality of service URLs (Uniform Resource Locator) of the network device into a common record and a service record, the service URLs specifying locations of XML (Extensive Markup Language) files that indicate different services provided by the network device, respectively, each of the common records including a MAC (Media Access Control) address, an IP (Internet Protocol) address and a port number of the network device, each of the service records including a directory file path to respective one of the XML files and a service identifier identifying respective one of the different services provided by the network device;

providing a management record of the service URLs of the network device in a memory component of the information processing device by sharing one of the common records of the service URLs between the service records of the service URLs such that the management record of the service URLs has the one of the common records and the service records in one-to-many correspondence to prevent the common records of the service URLs from being redundantly registered in the management record of the service URLs;

obtaining an IP address of a new network device when the new network device is newly connected to the network;

specifying a MAC address of the new network device based on the obtained IP address of the new network device;

determining whether or not the management record provided in the memory component includes the specified MAC address of the new network device; and updating the IP address of the common record in the management record provided in the memory component with the obtained IP address of the new network device when the management record provided in the memory component includes the specified MAC address of the new network device.

* * * * *